(12) United States Patent
Park et al.

(10) Patent No.: US 7,202,452 B2
(45) Date of Patent: Apr. 10, 2007

(54) COFFEE MAKER AND MICROWAVE OVEN AND METHOD FOR CONTROLLING THE SAME

(75) Inventors: Man Su Park, Changwon-si (KR); Jung Ju Kwon, Changwon-si (KR); Wang Lim Lee, Busan-si (KR); Dae Sik Kim, Changwon-si (KR); Wan Je Cho, Masan-si (KR); Seong Soo Choi, Changwon-si (KR); Dong Wan Seo, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/000,226

(22) Filed: Dec. 1, 2004

(65) Prior Publication Data

US 2005/0115960 A1 Jun. 2, 2005

(30) Foreign Application Priority Data

| Dec. 2, 2003 | (KR) | 10-2003-0086718 |
| Dec. 3, 2003 | (KR) | 10-2003-0087239 |
| Dec. 3, 2003 | (KR) | 10-2003-0087240 |
| Feb. 23, 2004 | (KR) | 10-2004-0011830 |
| Feb. 23, 2004 | (KR) | 10-2004-0011914 |

(51) Int. Cl.
*H05B 6/64* (2006.01)
*H05B 6/80* (2006.01)

(52) U.S. Cl. ............................. 219/689; 219/678
(58) Field of Classification Search ............ 219/689, 219/678, 687, 688; 99/451
See application file for complete search history.

(56) References Cited

U.S. PATENT DOCUMENTS

| 4,459,524 A | * | 7/1984 | Oota et al. ................ 318/484 |
| 4,949,627 A | | 8/1990 | Nordskog |
| 4,999,466 A | * | 3/1991 | Waligorski ................ 219/689 |
| 5,095,185 A | * | 3/1992 | Fuchs, Jr. ................. 219/689 |
| D340,831 S | | 11/1993 | Manabe |
| 5,300,743 A | * | 4/1994 | Park ........................ 219/689 |
| 5,360,964 A | * | 11/1994 | Park ........................ 219/689 |
| 5,434,392 A | * | 7/1995 | Belinkoff .................. 219/689 |

(Continued)

FOREIGN PATENT DOCUMENTS

| EP | 1 343 356 A | 9/2003 |
| JP | 2-37220 A | 2/1990 |
| JP | 06-076946 A | 3/1994 |
| JP | 63-299088 A | 12/1998 |

*Primary Examiner*—Daniel Robinson
(74) *Attorney, Agent, or Firm*—Birch, Stewart, Kolasch & Birch, LLP

(57) ABSTRACT

Coffee maker and microwave oven and method for controlling the same are disclosed.

The coffee maker and microwave oven includes an outfit room for mounting various electric components on an inside thereof, a case at one side of the outfit room, a water tank in the case, a funnel having a filter placed thereon for extraction of coffee, a jug under the funnel for storage of extracted coffee, a water supply pipe having one end connected to the water tank, the other end position over the funnel, and a portion on a bottom of the case, and a heater assembly on the bottom of the case, the heater assembly having a heating heater for heating potable water passing through the water supply pipe, and a heat conservation heater for heating coffee in the jug to maintain a temperature of the coffee constant.

22 Claims, 11 Drawing Sheets

U.S. PATENT DOCUMENTS

| | | | |
|---|---|---|---|
| 5,491,322 A * | 2/1996 | Waligorski | 219/689 |
| 5,832,809 A * | 11/1998 | Gras | 99/299 |
| 6,600,875 B2 | 7/2003 | Kodden et al. | |
| 6,948,419 B2 | 9/2005 | Pan et al. | |
| 2003/0168447 A1 | 9/2003 | Lee | |

* cited by examiner

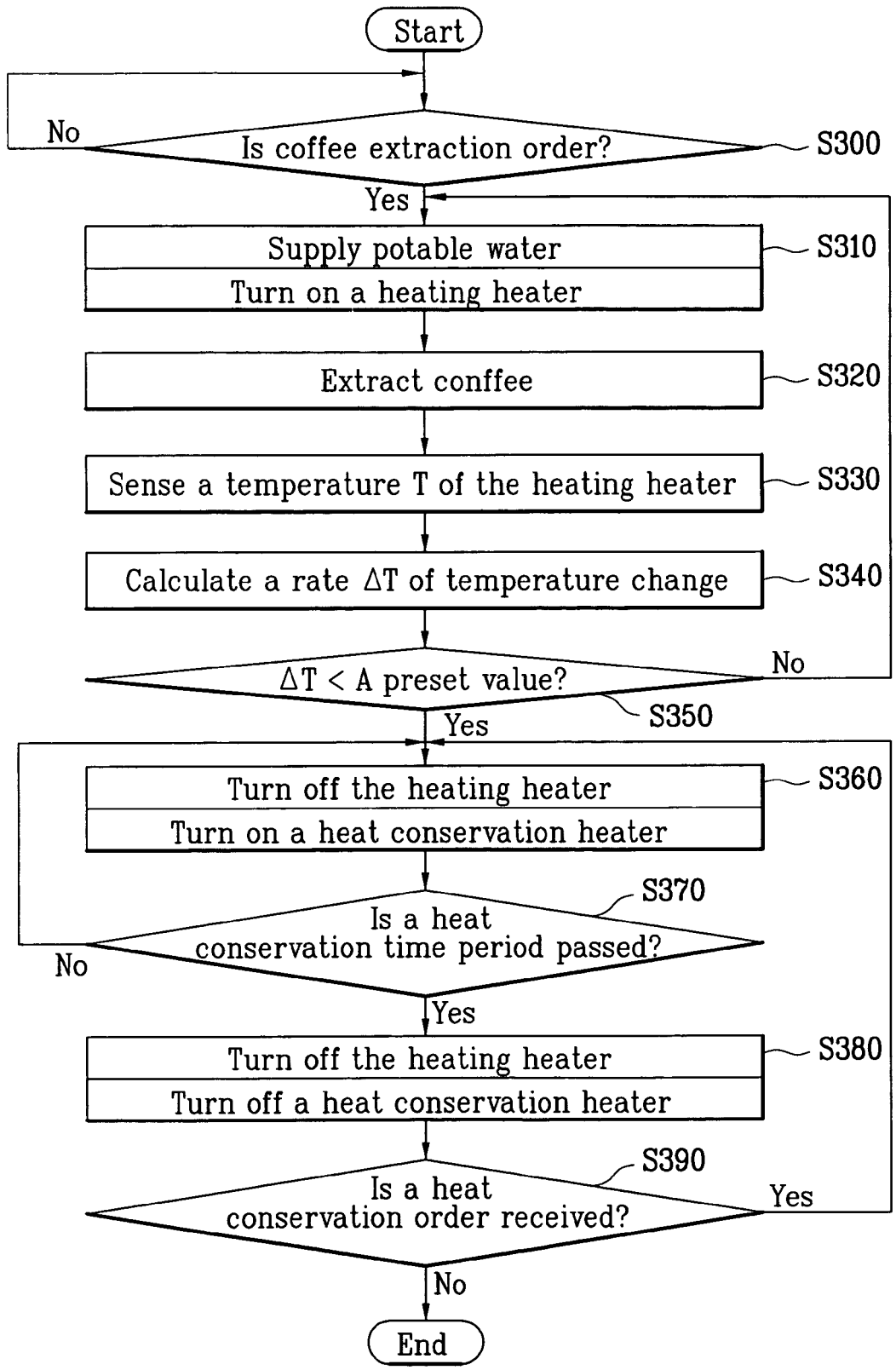

COFFEE MAKER AND MICROWAVE OVEN AND METHOD FOR CONTROLLING THE SAME

CROSS-REFERENCE TO RELATED APPLICATIONS

This application claims the benefit of Korean Application Nos. P2003-86718, filed on Dec. 2, 2003, P2003-87239 and P2003-87240, both filed on Dec. 3, 2003, and P2004-11914 and P2004-11830, both filed on Feb. 23, 2004, which are hereby incorporated by reference as if fully set forth herein.

BACKGROUND OF THE INVENTION

1. Field of the Invention

The present invention relates to coffee maker and microwave ovens, and more particularly, to a coffee maker and microwave oven and a method for controlling the same which has a coffee extraction function.

2. Discussion of the Related Art

In general, a microwave oven cooks food with intermolecular frictional heat generated as a high frequency wave (about 2,450 MHz) disturbs molecular arrangement of the food.

Because the microwave oven heats the food with the high frequency wave, the microwave oven cannot cook various kinds of food. For an example, coffee, people enjoys to drink, cannot be prepared with the microwave oven, to require a coffee maker, separately.

However, presently, as a city grows the denser, leading to have a small residential space, and according to the trend of pursuing practicality, the various necessaries of life, starting from home appliances, are required to be compact, such that the home appliances are required to have, not only the traditional original functions, but also various extra functions.

However, the related art microwave oven cannot meet such consumer demands.

SUMMARY OF THE INVENTION

Accordingly, the present invention is directed to a coffee maker and microwave oven and a method for controlling the same that substantially obviates one or more problems due to limitations and disadvantages of the related art.

An object of the present invention is to provide a coffee maker and microwave oven and a method for controlling the same which have a coffee extraction function.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a coffee maker and microwave oven includes an outfit room for mounting various electric components on an inside thereof, a case at one side of the outfit room, a water tank in the case, a funnel having a filter placed thereon for extraction of coffee, a jug under the funnel for storage of extracted coffee, a water supply pipe having one end connected to the water tank, the other end position over the funnel, and a portion on a bottom of the case, and a heater assembly on the bottom of the case, the heater assembly having a heating heater for heating potable water passing through the water supply pipe, and a heat conservation heater for heating coffee in the jug to maintain a temperature of the coffee constant.

The heater assembly further includes a heater tube in contact with the water supply pipe on the bottom of the case, having the heating heater and the heat conservation heater mounted therein.

The heating heater includes a heating wire with a 750 W power consumption, and the heat conservation heater includes a heating wire with a 90 W power consumption.

The heating heater has a fixed gap to the heat conservation heater, and the heating heater is wound around an axis of the heater tube in a helix, and the heat conservation heater is wound along an inside circumferential surface of the heater tube in a helix.

The heating heater and the heat conservation heater include insulating portion at both ends respectively, for preventing short circuit. The insulating portion of the heating heater is longer than the insulating portion of the heat conservation heater.

The coffee maker and microwave oven further includes a temperature sensor on an outside surface of the heater tube for measuring a temperature of the heating heater. Preferably, the temperature sensor includes a thermistor of which internal resistance varies with a temperature.

The funnel is at a center of an inside of the water tank, and the water pipe includes a shower head at the other end thereof over the funnel for spraying potable water into an inside of the funnel.

The heater assembly further includes a heater tube in contact with a portion of the water supply pipe on the bottom of the case, the heater tube having the heating heater provided therein.

The heating heater includes first terminals at both ends respectively connected to a coil for supplying power, and the heating heater includes a sheath heater.

The heat conservation heater is positioned opposite to the heating heater with respect to a portion of the water supply tube on the bottom of the case.

The heat conservation heater includes a plate heater in close contact with an underside of the case.

The heat conservation heater includes a second terminal on one side of an underside thereof connected to a coil for supplying power thereto, and the heat conservation heater is enclosed with a metal plate having a good thermal conductivity excluding a portion having the second terminal formed thereon.

The coffee maker and microwave oven further includes a heat conduction plate on an underside of the case for effective transmission of heat from the heat conservation heater to the jug, and the heat conservation heater is in close contact with an underside surface of the heat conduction plate.

The case further includes a door panel on a front of the case, having a portion positioned below the heat conservation heater, and the heat conservation heater includes a shielding plate on an underside of the heat conservation heater for preventing transmission of heat from the heat conservation heater to the door panel.

The second terminal includes at least two conductive wires wound around the second terminal and connected to the coil, and the connection portion of the conductive wires and the coil further includes an insulating tube.

In another aspect of the present invention, a method for controlling a coffee maker and microwave oven, includes the steps of supplying potable water to a funnel through a water supply pipe, and putting a heating heater into operation for heating the potable water, upon reception of a coffee extraction order, extracting coffee at the funnel, counting an operation time period of the heating heater, comparing the operation time period of the heating heater to a preset time period, and stopping the heating heater, and putting a heat conservation heater into operation for conservation of a temperature of the extracted coffee, if the operation time period of the heating heater exceeds the preset time period.

The preset time period is determined by a test as a maximum time period required for extraction of coffee.

In another aspect of the present invention, a method for controlling a coffee marker and microwave oven, includes the steps of supplying potable water to a funnel through a water supply pipe, and putting a heating heater into operation for heating the potable water, upon reception of a coffee extraction order, measuring a temperature of the heating heater by using a temperature sensor, receiving the measure temperature periodically, and calculating a rate of temperature change of the heating heater, determining whether the rate of temperature change is lower than a preset value or not, and putting a heat conservation heater into operation such that the heat conservation heater is in operation together with the heating heater for extracting coffee, if the rate of temperature change lower than the preset value.

The rate of temperature change of the heater is calculated according to the following equation.

$$\Delta T = (T_n - T_{n-1})/(t_n - t_{n-1})$$

Where, $\Delta T$ denotes a rate of temperature change of the heater, $T_n$ denotes the heater temperature measured at a $t_n$ time, and $T_{n-1}$ denotes the heater temperature measured at a $t_{n-1}$ time.

The method further includes the steps of determining whether the coffee extraction is finished or not, and, if the coffee extraction is finished, stopping the heating heater, to operate the heat conservation heater only, for conservation of the temperature of the extracted coffee.

In further aspect of the present invention, a method for controlling a coffee maker and microwave oven, includes the steps of supplying potable water to a funnel through a water supply pipe, and putting a heating heater into operation for heating the potable water, upon reception of a coffee extraction order, extracting coffee at the funnel, upon finishing extraction of coffee, operating a heat conservation heater for a preset heat conservation time period, to conserve a heat of the extracted coffee, stopping the heat conservation heater if the heat conservation time period is passed, and upon reception of a coffee heat conservation order, the heat conservation heater being put into operation, for carrying out heat conservation of the coffee, again.

The step of operating a heat conservation heater includes the steps of measuring a temperature of the heating heater with a temperature sensor, receiving the measured temperature periodically, and calculating a rate of temperature change of the heating heater, comparing the rate of temperature change to a preset value, and if the rate of temperature change exceeds the preset value, stopping the heating heater, and putting the heat conservation heater into operation.

The rate of temperature change of the heater is calculated according to the following equation.

$$\Delta T = (T_n - T_{n-1})/(t_n - t_{n-1})$$

Where, $\Delta T$ denotes a rate of temperature change of the heater, $T_n$ denotes the heater temperature measured at a $t_n$ time, and $T_{n-1}$ denotes the heater temperature measured at a $t_{n-1}$ time.

The step of the heat conservation heater being put into operation includes the steps of determining whether the coffee heat conservation order is received or not, and, if the coffee heat conservation order is received, putting only the heat conservation heater into operation, for conservation of heat of the coffee, again.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 12 illustrates a flow chart showing the steps of a method for controlling a coffee maker and microwave oven in accordance with a sixth preferred embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
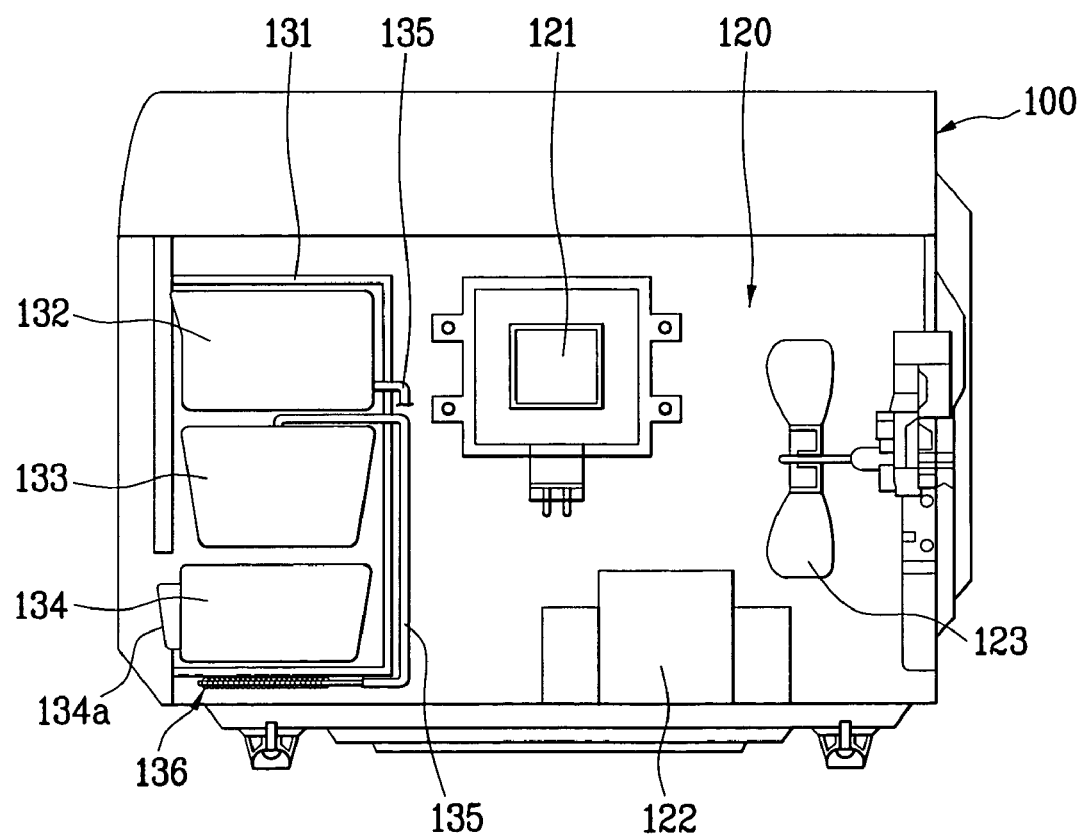
FIG. 1 illustrates a section of a coffee maker and microwave oven in accordance with a first preferred embodiment of the present invention.
Figure 2:
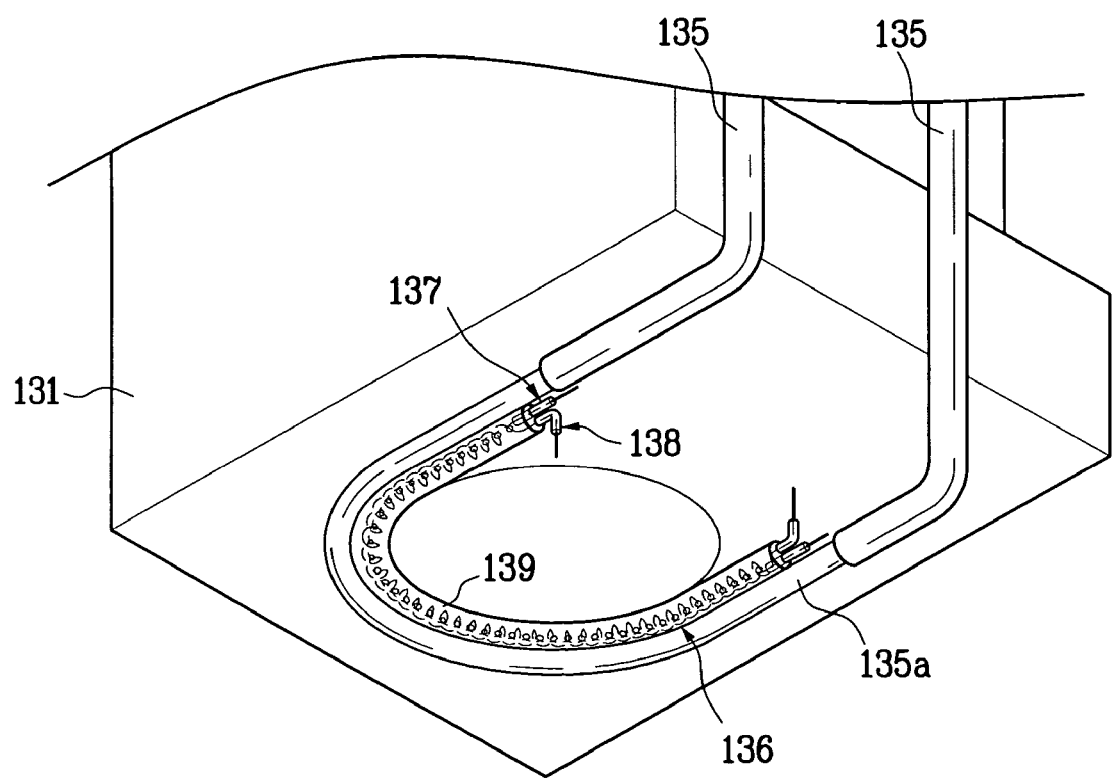
FIG. 2 illustrates a bottom perspective view of a coffee maker unit in FIG. 1.

FIG. 1 illustrates a section of a coffee maker and microwave oven in accordance with a first preferred embodiment of the present invention, and FIG. 2 illustrates a bottom perspective view of a coffee maker unit in the coffee maker and microwave oven in FIG. 1.

Referring to FIGS. 1 and 2, the coffee maker and microwave oven includes a cabinet 100 forming an exterior, an outfit room 120 in the cabinet 100, and a coffee maker unit at one side of the outfit room 120.

In the outfit room 120, there are various electric parts, such as a magnetron 121, a high voltage transformer 122, and a convection fan 123. The magnetron 121 receives an external high voltage power, and generates a microwave, and the high voltage transformer 122 transforms external power to high voltage power, before application to the magnetron 121. The convection fan 123 cools down various components in the outfit room 120, and blow hot air to a cooking chamber (not shown).

The coffee maker unit includes a case 131 at one side of the outfit room 120, a water tank 132, a funnel 133, a water supply pipe 135, and a heater assembly 136.

The case 131 forms an exterior of the coffee maker unit, and the water tank 132 is at an upper portion of the case 121 for storing potable water.

The funnel 133 under the water tank 132 has a filter (not shown) for extracting coffee. In more detail, the funnel 133 has a shape of a cone having a great upper inside diameter, and a small lower inside diameter. On an inside of the funnel 133, there is a filter (not shown) of paper of non-woven fabric placed on an inside, on which coffee powder is filled.

Therefore, when a hot potable water is supplied to the funnel 133, the coffee powder is dissolved in the water, and coffee solution passes through the filter and drops downward. For this, under the funnel 133, there is a drop hole (not shown) in a bottom of the funnel 133 for enabling the coffee solution to drop downward.

In the meantime, under the funnel 133, there is a jug 134 as a container for storing coffee. The jug 134 has an opened top with a hand grip 134a at one side.

Accordingly, by gripping the hand grip 134a, the user can put the jug 134 inside of the case 31, or take the jug 134 out of the case 131, easily. In general, the jug 134 is formed of transparent glass or plastic for the user to see a level of the coffee in the jug 134.

The water supply pipe 135 supplies the potable water from the water tank 132 to the funnel 133. The water supply pipe 135 has one end connected to the water tank 132, the other end positioned above the funnel 133, and a portion 135a on a bottom of the case 131.

The heater assembly 136 is on the bottom of the case 131, and includes a heating heater 135a, and a heat conservation heater 138.

During operation of the coffee maker unit 130, the heating heater 137 heats the potable water being supplied to the funnel 133 along the water supply pipe 135. The heat conservation heater 138 heats coffee in the jug 134, to maintain the coffee at a constant temperature. That is, the heat conservation heater 138 heats the jug 134 on the bottom of the case 131 after extraction of coffee is finished, to maintain the extracted coffee in a warm state.

Moreover, the heater assembly 136 is in contact with a portion 135a of the water supply pipe 135 on the bottom of the case 131, and further includes heater tube 139 having the heating heater 137 and the heat conservation heater 138 provided therein. Heat is transmitted from the heating heater 137 or the heat conservation heater 138 to the water supply tube 135 and the jug 134 through the heater tube 139.

Figure 3:
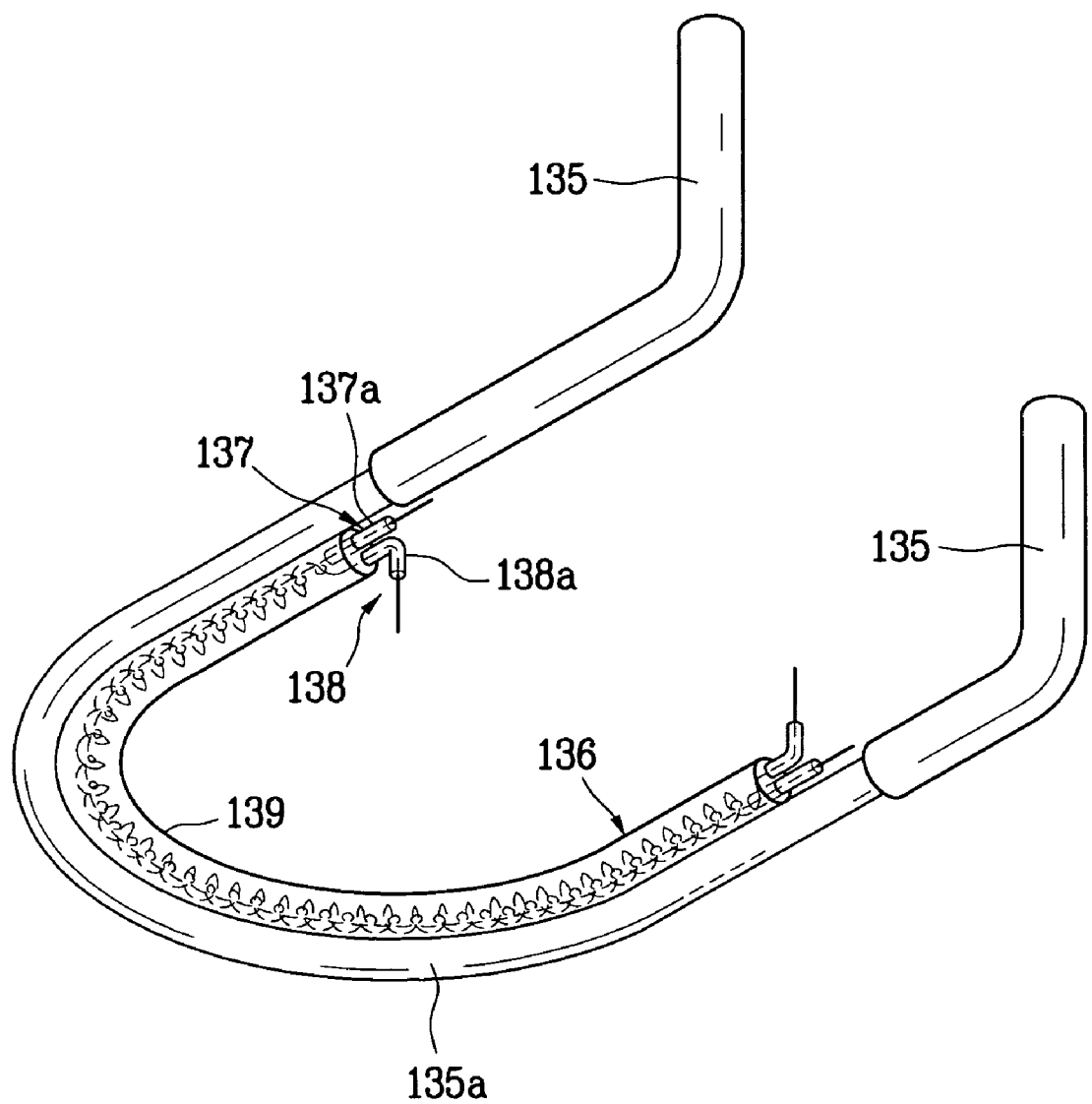
FIG. 3 illustrates a perspective view of a heater assembly in accordance with a first preferred embodiment of the present invention.
Figure 4:
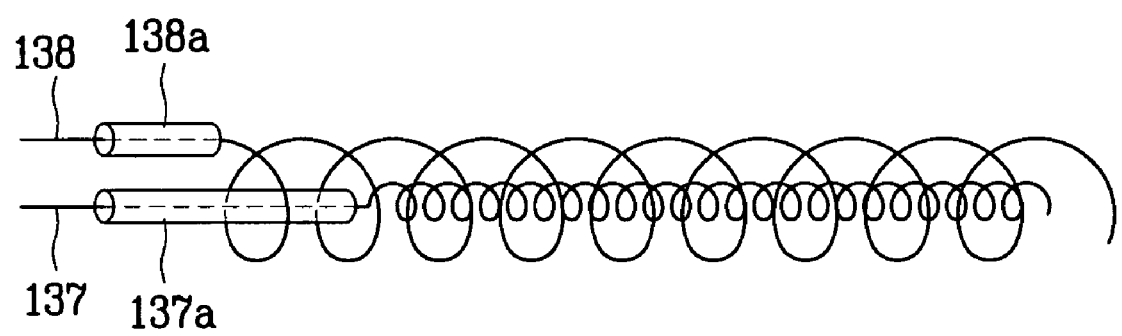
FIG. 4 illustrates a diagram showing detail of a heating heater and a heat conservation heater.

FIG. 3 illustrates a perspective view of a heater assembly in accordance with a first preferred embodiment of the present invention, and FIG. 4 illustrates a diagram showing detail of a heating heater and a heat conservation heater.

Referring to FIGS. 3 and 4, the heating heater 137 and the heat conservation heater 138 will be described in detail. The heating heater 137 is constructed of a heating wire having about 750 W power consumption, and the heat conservation heater 138 is constructed of a heating wire having about 90 W power consumption.

There is a gap between the heating heater 137 and the heat conservation heater 138, for preventing short circuit caused by contact. In detail, the heating heater 137 is arranged in a helix around an axis of the heater tube 139, and the heat conservation heater 138 is arranged in a helix along an inside circumferential surface of the heater tube 139.

The heating heater 137 and the heat conservation heater 138 have insulating portions 137a, and 138a at both ends, respectively. The insulating portions 137a, and 138a prevent the heating heater 137 and the heat conservation heater 138 from coming into contact with each other at portions thereof extended to an outside of the heater tube 139.

It is preferable that the insulating portion 137a of the heating heater 137 is extended longer than the insulating portion 138a of the heat conservation heater 138 for preventing the heating heater 137 and the heat conservation heater 138 from coming into contact with each other, more positively.

In the meantime, the heater assembly 136 may be constructed of the heating heater 137 only. In this instance, the heating heater 137 not only heats the potable water, but also conserves heat of the coffee in the jug 134 after finish of the extraction of coffee, at the same time.

However, in this case, since conservation of heat of the coffee is made with the heating heater 137 having a relatively higher power consumption, power is consumed unnecessarily. Particularly, when the coffee maker is in operation together with the microwave oven, the power consumption increases excessively.

In more detail, presently, a standard upper limit value of a current to the microwave oven is 15[A]. However, if conservation of heat of the coffee is made with the heating heater 137, it is made known from a test that a total current becomes 21[A] when the microwave oven unit and the coffee maker unit are operated at the same time.

At the end, in order to meet the current upper limit, the microwave oven unit and the coffee maker unit are operated, not at the same time, but either one, selectively. Therefore, it is preferable that the heater assembly 136 includes not only the heating heater 137, but also the heat conservation heater 138.

Thus, the first preferred embodiment of the present invention includes the heat conservation heater 138 separately, for conservation of heat of coffee. According to this, unnecessary consumption of power can be prevented, to enable operation of the microwave oven unit and the coffee maker unit at the same time.

In the meantime, if the user puts the coffee maker unit into operation, failing to know that, for an example, there is no water in the water tank 132 by mistake, the coffee maker and microwave oven in accordance with a first preferred embodiment of the present invention may be involved in fire hazard and damage to the electric components caused by overheating of the heating heater 137.

Figure 5:
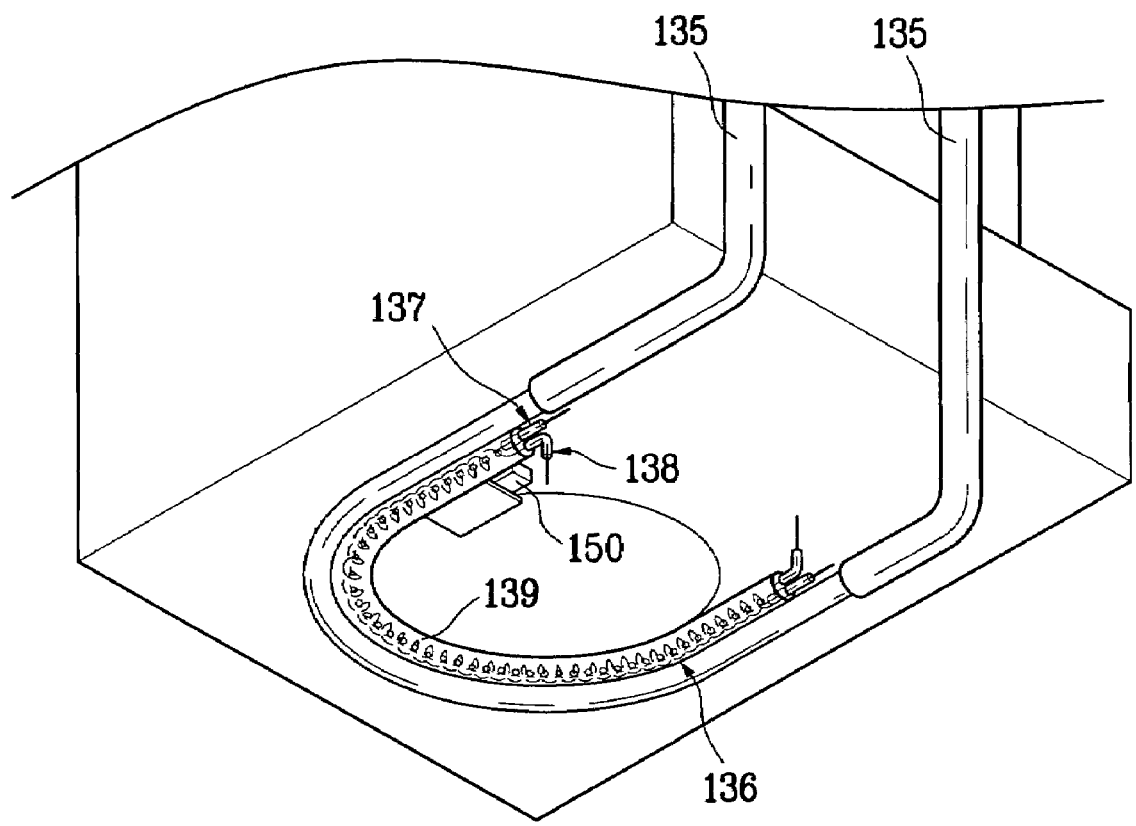
FIG. 5 illustrates a perspective view of a coffee maker and microwave oven in accordance with a second preferred embodiment of the present invention.

FIG. 5 illustrates a perspective view of a coffee maker and microwave oven in accordance with a second preferred embodiment of the present invention.

Referring to FIG. 5, the coffee maker and microwave oven includes a temperature sensor 150 mounted on an outside surface of the heater tube 139.

The temperature sensor 150 measures a temperature of the heating heater 137 periodically. Then, the measured temperature value is provided to a control unit (not shown) for controlling operation of the coffee maker unit.

The control unit determines whether the heating heater 137 is overheated or not according to the temperature value received. If it is determined that the heating heater 137 is overheated, power to the heating heater 137 is cut off, to stop operation of the heating heater 137.

It is preferable that the temperature sensor includes a thermistor of which internal resistance varies with a temperature.

Thus, since the temperature sensor 150 is provided, the coffee maker and microwave oven in accordance with a second preferred embodiment of the present invention can prevent problems caused by overheating of the heating heater 137.

Figure 6:
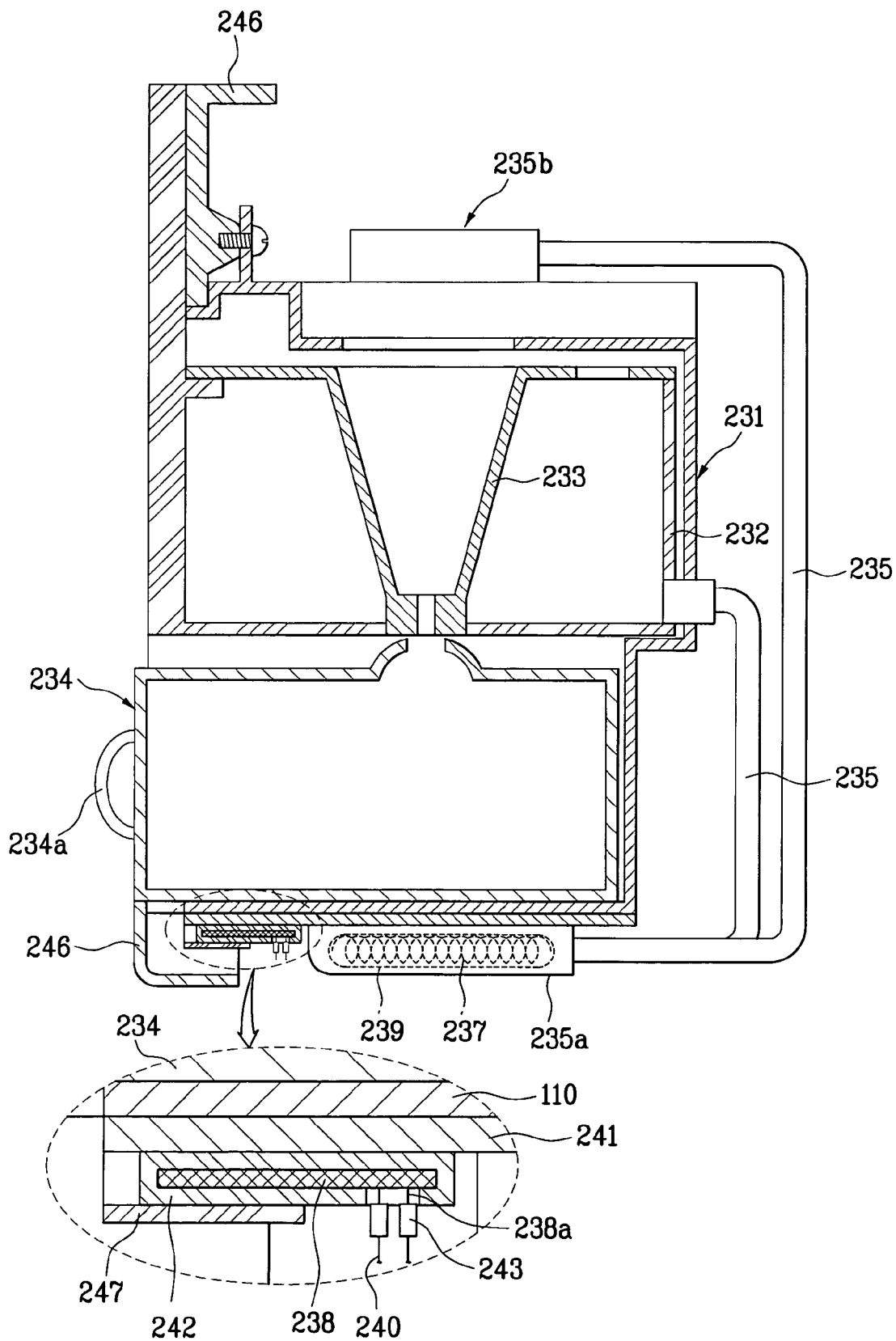
FIG. 6 illustrates a section of a coffee maker and microwave oven in accordance with a third preferred embodiment of the present invention.
Figure 7:
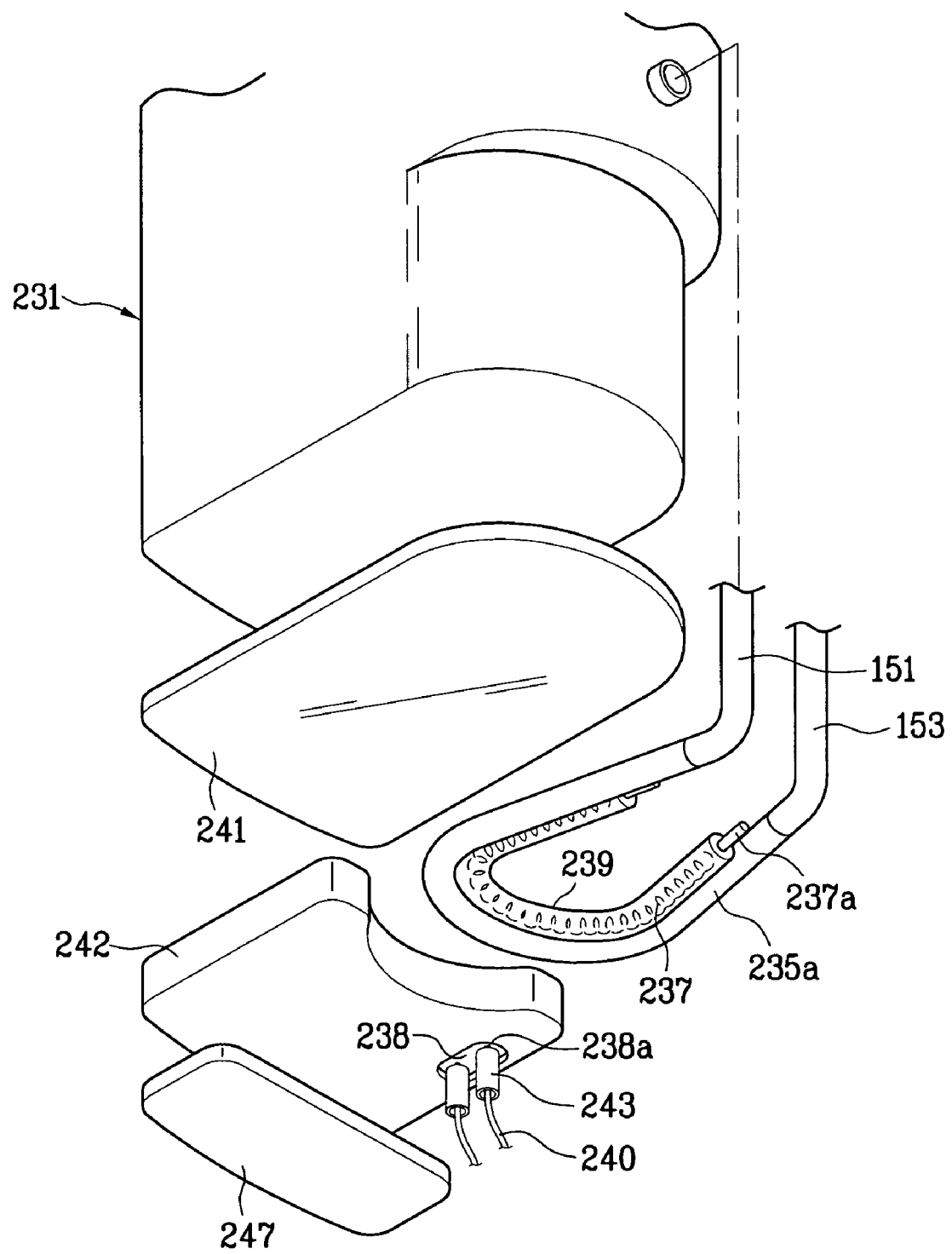
FIG. 7 illustrates a perspective view of a coffee maker and microwave oven in accordance with a third preferred embodiment of the present invention.
Figure 8:
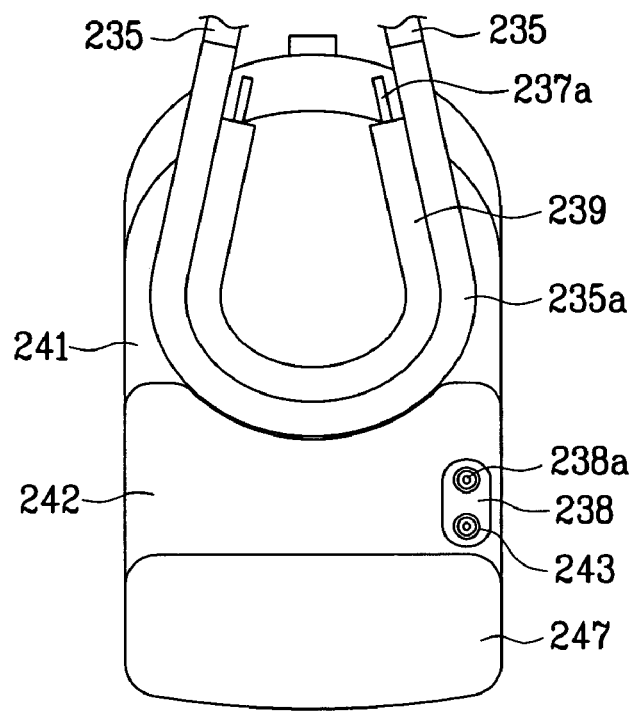
FIG. 8 illustrates a bottom view of a coffee maker and microwave oven in accordance with a third preferred embodiment of the present invention.

FIG. 6 illustrates a section of a coffee maker and microwave oven in accordance with a third preferred embodiment of the present invention, FIG. 7 illustrates a bottom perspective view of a coffee maker and microwave oven in accordance with a third preferred embodiment of the present invention, and FIG. 8 illustrates a bottom view of a coffee maker and microwave oven in accordance with a third preferred embodiment of the present invention.

Referring to FIGS. 6 to 8, the coffee maker and microwave oven includes a case 231, a water tank 232, a funnel 233, a water supply pipe 235, and a heater assembly at one side of an outfit room 120 (see FIG. 1).

The case 231 forms an exterior of the coffee maker unit, and the water tank 232 is mounted on an upper space of the case 231, for storing potable water.

Different from the first embodiment, the funnel 233 is at a center of an inside of the water tank 232. The positioning of the funnel 233 at an inside of the water tank 232 enables to provided more compact coffee maker than that of the first embodiment which has spaces on upper sides and lower sides of the water tank 232 and the funnel 233, respectively.

In the meantime, there is a jug 234 under the funnel 233 as a container for storing coffee. The jug 234 has a shape of a container having an opened top, with a hand grip 234a at one side thereof.

The water supply pipe 235 supplies potable water from the water tank 232 to the funnel 233. The water supply pipe 235 has one end connected to the water tank 232, the other end positioned over the funnel 233, and a portion 235a under the case 231. There is a shower head 235b at the other end of the water supply pipe 235 for spraying potable water into an inside of the funnel 233.

In the meantime, the heater assembly includes a heating heater 237, a heat conservation heater 238, both under the case 231.

The heating heater 237 heats potable water being supplied to the funnel 233 along the water supply pipe 235 during operation of the coffee maker unit. The heat conservation heater 238 heats the coffee in the jug 234, to maintain the coffee at a constant temperature.

The heat assembly further includes a heater tube 239 in contact with the portion 235a of the water supply pipe 235 under the case 231. The heating heater 237 is inside of the heater tube 239.

The heating heater 237 has first terminals 237a at both ends of the heating heater 237, connected to a coil (not shown) which supplies power.

It is preferable that the heating heater 237 includes a sheath heater having about 750 W of power consumption. As the sheath heater is a kind of heater used widely, a detailed description of which will be omitted.

The heat conservation heater 238 is on an opposite side of the heating heater 237 with respect to the portion 235a of the water supply pipe 235 under the case 231.

It is preferable that the heat conservation heater 238 includes a plate heater in close contact with an underside of the case 231, to supply heat to the jug 234, uniformly.

At one side of an underside of the heat conservation heater 238, there is a second terminal 238a connected to the coil 240 for supplying power.

The heat conservation heater 238 has about 90 W of power consumption, for enabling use of the microwave oven unit even during operation of the heat conservation heater 238 like the first embodiment.

In the meantime, on an underside of the case 31, there is a heat conduction plate 241 of good thermal conductivity for effective transmission of heat from the heat conservation heater 238 to the jug 234.

In this instance, the portion 235a of the water supply pipe 235, and the heater tube 239 is provided on an underside of the heat conduction plate 241, particularly, the heat conservation heater 238 is in close contact with the heat conduction plate 241.

In the meantime, it is preferable that the heat conservation heater 238 is enclosed with a metal plate 242 having a good thermal conductivity except the portion of the second terminal 238a. The metal plate 242 prevents the heat conservation heater 238 from being in direct contact with the underside of the case 231, and enables fast transmission of heat from the heat conservation heater 238 to the jug 234.

However, if the heat conservation heater 238 is enclosed with the metal plate 242, the second terminal 238a is liable to contact with the metal plate 242. Therefore, the second terminal 238a is provided with an insulating portion 243.

The insulating portion 243 prevents the second terminal 238a from being brought into contact with the metal plate 242 when the second terminal 238a bent to one side. In more detail, it is preferable that the insulating portion 243 is formed of an insulating material, such as silicon.

On a front of the case 231, there is a door panel 246 of the cabinet 100 (see FIG. 1) mounted thereon. In general, the door panel 246 is formed of ABS resin (Acrylonitrile Butadiene Styrene Copolymer), and has a portion under the heat conservation heater 238.

Therefore, when the heat conservation heater 238 starts to operate, the portion of the door panel 246 under the heat conservation heater 238 is liable to suffer from damage caused by heat. In order to prevent this, on an underside of the heat conservation heater 238, there is a shielding plate 247 for shielding the heat from the heat conservation heater 238.

Of course, in a case the heat conservation heater 238 is enclosed with the metal plate 242, the shielding plate 247 is placed on an underside of the metal plate 242.

Figure 9:
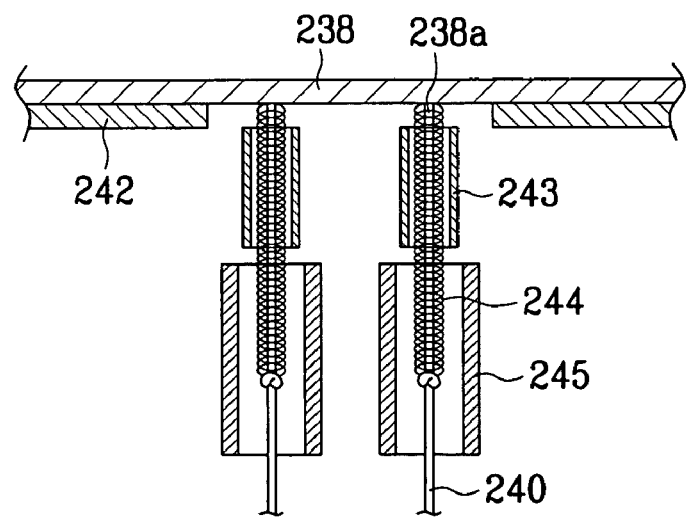
FIG. 9 illustrates a partial side section of a coffee maker and microwave oven in accordance with a third preferred embodiment of the present invention.

FIG. 9 illustrates a partial side section of a coffee maker and microwave oven in accordance with a third preferred embodiment of the present invention.

In the meantime, referring to FIG. 9, around the second terminal 238a connected to the coil 240, there are at least two conductive wires wound thereon, for enlarging a surface area of the second terminal 238a, to reduce a resistance thereof.

In more detail, if a current flows to the second terminal 238a through the coil 240, there is an induced electromotive force generated at an inside of the second terminal 238a that impedes flow of the current. The induced electromotive force increases an internal resistance of the second terminal 238a, to overheat the second terminal 238a.

This is called as a skin effect, and the conductive wires 244, wound around the second terminal 238a to increase a surface area of the second terminal 238a, decreases the skin effect. That is, the conductive wires 244 reduce the resistance of the second terminal 238a, to make a current flow smooth.

The conductive wires 244 are connected to the coil 240. According to this, a connection portion of the second terminal 238a and the coil 240, which is relatively weak to an external force, is reinforced by the conductive wires 244, to prevent the connection portion of the second terminal 238a and the coil 240 from breaking, easily.

It is preferable that an insulating tube 245 is provided to the connection portion between the conductive wires 244 and the coil 240. The insulating tube 245 surrounds the connection portion between the conductive wires 244 and the coil 240, for protecting the connection portion from an external force, and improving an insulating performance.

In detail, the insulating tube 245 is formed of an insulating material, such as silicon rubber.

Thus, alike the first embodiment, the coffee maker and microwave oven in accordance with the third preferred embodiment of the present invention permits simultaneous operation of the coffee maker unit and the microwave oven unit by providing the heating heater 237, and the heat conservation heater 238.

Moreover, by using a plate heater as the heat conservation heater 238 for improving thermal conductivity, and by providing a heat conduction plate 241 to be in close contact with the plate heater on the underside of the case 231, smooth heat conservation of the coffee is made possible with a low power consumption.

Furthermore, alike the second embodiment, the coffee maker and microwave oven in accordance with the third preferred embodiment of the present invention may includes a temperature sensor 150 (see FIG. 5) for preventing the heating heater 237 from overheating.

Methods for controlling a coffee maker and microwave oven in accordance with the foregoing embodiments of the present invention will be described.

Figure 10:
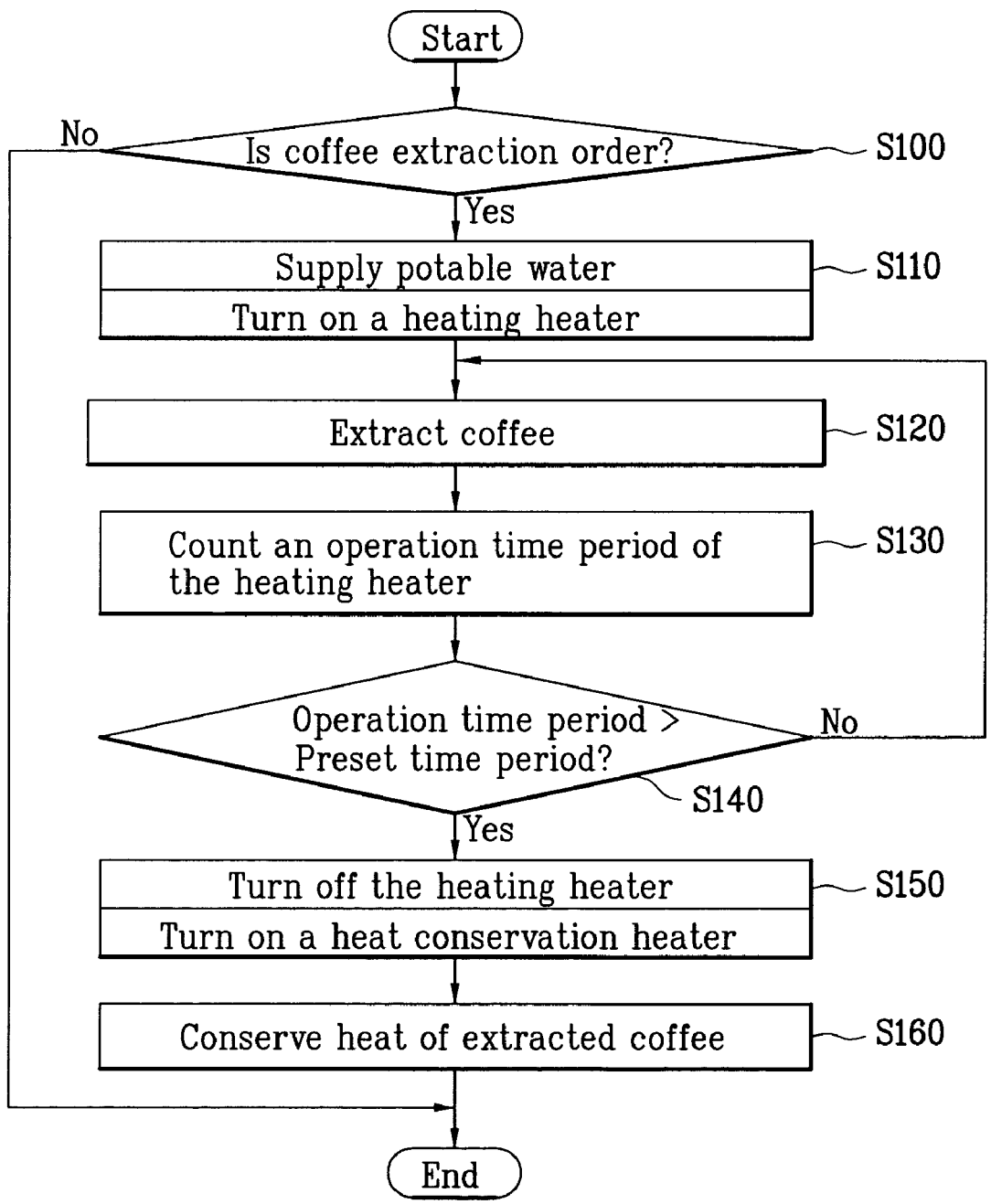
FIG. 10 illustrates a flow chart showing the steps of a method for controlling a coffee maker and microwave oven in accordance with a fourth preferred embodiment of the present invention.

FIG. 10 illustrates a flow chart showing the steps of a method for controlling a coffee maker and microwave oven in accordance with a fourth preferred embodiment of the present invention.

Referring to FIG. 10, the control unit determines whether a coffee extraction order for the coffee maker unit is received from a user or not (S100). In general, the coffee extraction order is applied to a key panel (not shown) on a front of the microwave oven unit.

As a result of the determination (S100), if the coffee extraction order is received from the user, potable water is supplied to a funnel 133, or 233 through a water supply pipe 135, or 235, and, at the same time with this, a heating heater is put into operation, to heat the potable water (S110).

In this instance, the potable water is heated with the heating heater 137 or 237 in a course the potable water is supplied to the funnel 233. The coffee is extracted by the heated potable water at the funnel 133 or 233 (S120).

During above steps (S100~S120) are progressed, the control unit counts an operation time period of the heating heater 137, or 237, and compares the operation time period of the heating heater 137, or 237 to a preset time period (S130) (S140).

For this, the control unit has a timer for counting the operation time period of the heating heater 137 or 237, and a memory for storing the preset time period.

The preset time period is a maximum time period required starting from application of the coffee extraction order by the user to extraction of coffee, determined by test at the time of production.

That is, the preset time period is a maximum operation time period of the heating heater 137 or 237 for extraction of the coffee. Therefore, the preset time period varies with a capacity of the coffee maker unit, and the like.

As a result of the determination (S140), if the operation time period of the heating heater 137, or 237 does not exceed the preset time period, the heating heater 137 or 237 is kept operation, to keep extraction of coffee.

On the other hand, as the result of the determination (S140), if the operation time period of the heating heater 137, or 237 exceeds the preset time period, the heating heater 137 or 237 is stopped, and the heat conservation heater 138 or 238 is put into operation, to maintain a temperature of the extracted coffee (S150) (S160).

Accordingly, though extraction of coffee is performed by the heating heater 137, or 237, conservation of heat of the extracted coffee having extraction of coffee finished is performed by the heat conservation heater 138, or 238.

Thus, in the fourth embodiment, if the operation time period of the heating heater 137 or 237 exceeds the preset time period, the control unit stops the heating heater 137 or 237, to prevent a problem caused by overheating of the heating heater 137 or 237 from occurring in advance.

Moreover, the conservation of heat of the extracted coffee is performed by the heat conservation heater 138, or 238 having a power consumption relatively lower than the heating heater 137 or 237, the coffee maker unit and the microwave oven unit can be operated at the same time.

Figure 11:
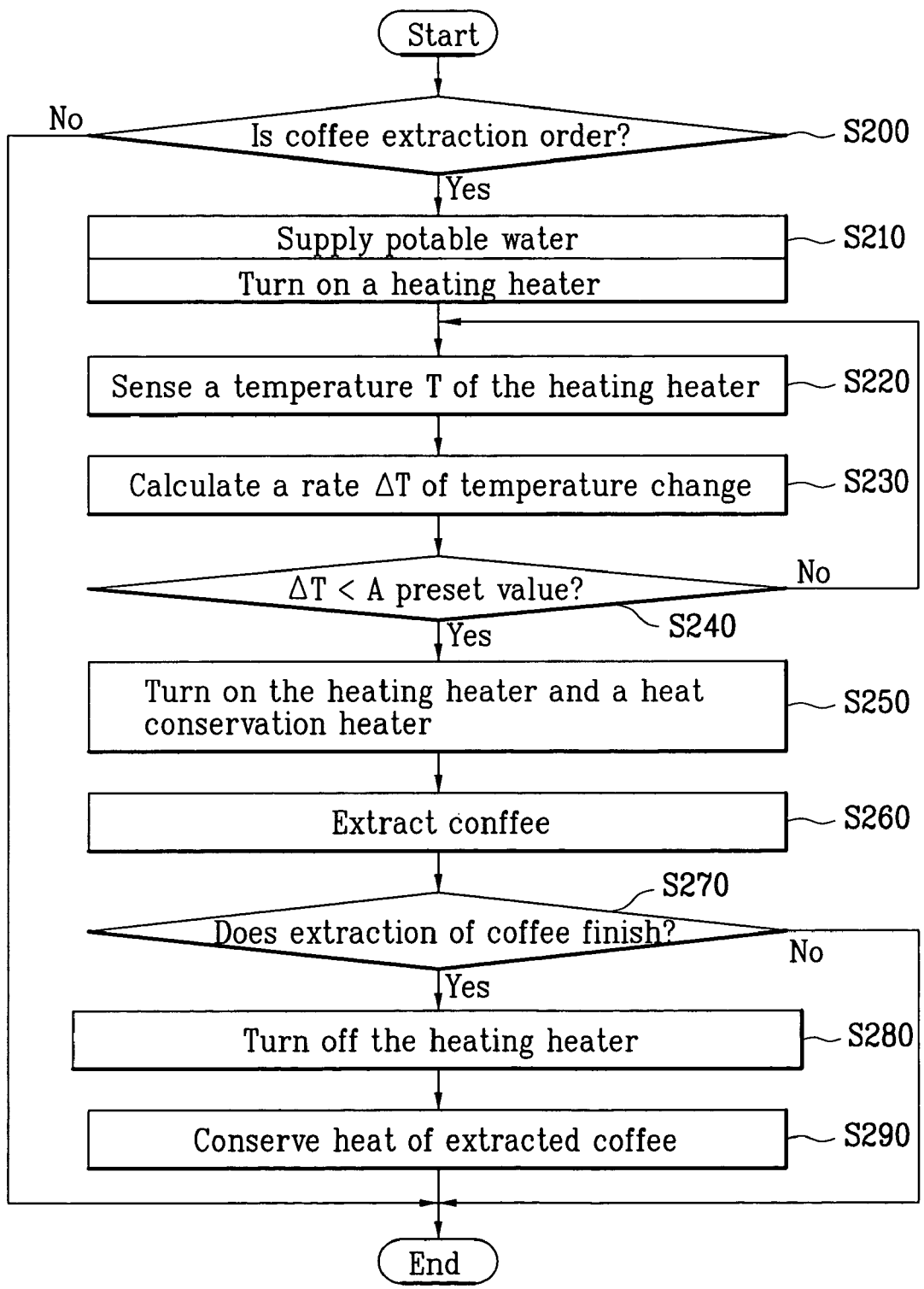
FIG. 11 illustrates a flow chart showing the steps of a method for controlling a coffee maker and microwave oven in accordance with a fifth preferred embodiment of the present invention.

FIG. 11 illustrates a flow chart showing the steps of a method for controlling a coffee maker and microwave oven in accordance with a fifth preferred embodiment of the present invention.

Referring to FIG. 11, a control unit determines whether a coffee extraction order is received from a user or not (S200). In general, the coffee extraction order is applied to a key panel (not shown) on a front of the microwave oven unit.

As a result of determination (S200), if the coffee extraction order is received, potable water is supplied to the funnel 133, or 233, and, at the same time with this, the heating heater 137, or 237 is put into operation, to heat the potable water (S210).

Then, the temperature sensor 150 measures a temperature T of the heating heater 137, or 237 periodically (S220). The control unit receives the temperature T having the temperature sensor 150 sensed, and calculates a rate $\Delta T$ of temperature change of the heating heater 137, or 237 (S230).

The rate of temperature change of the heating heater 137 or 237 is calculated according to the following equation.

$$\Delta T = (T_n - T_{n-1})/(t_n - t_{n-1})$$

Where, $\Delta T$ denotes a rate of temperature change of the heater, $T_n$ denotes the heating heater temperature measured at a $t_n$ time, and $T_{n-1}$ denotes the heating heater temperature measured at a $t_{n-1}$ time.

Then, the control unit determines whether the rate ΔT of temperature change calculated is lower than a preset value (S240).

If the rate ΔT of temperature change calculated is lower than a preset value, the heat conservation heater 138, or 238 is operated together with the heating heater 137, or 237, to extract coffee (S250) (S260).

The preset value is a very small value close to '0' stored in the memory of the control unit.

In more detail, the heating heater 137, or 237 has a temperature which rises rapidly at the same time of starting the heating heater 137, or 237 for heating the potable water. If there is an adequate rate of potable water flow to the funnel 133, or 233 along the water supply pipe 135, or 235, the temperature of the heating heater 137, or 237 rises no more, but maintains a fixed value.

At a time point the heating heater 137, or 237 starts to maintain the fixed temperature, i.e., the rate ΔT of temperature change being '0', the heat conservation heater 520 is put into operation. Therefore, the preset value, which is to be compared to the rate ΔT of temperature change of the heating heater 137, or 237, is set to be a value very close to '0'.

In the meantime, as described before, when the heating heater 137, or 237 and the heat conservation heater 138, or 238 are operated together, the potable water passing through the water supply pipe 135 is heated more quickly, before being supplied to the funnel 133, or 233.

Accordingly, if the heating heater 137, or 237 and the heat conservation heater 138, or 238 are operated together, a time period required for extraction of coffee can be shortened compared to a case when only the heating heater 137, or 237 is operated.

Thereafter, if it is determined that extraction of coffee is finished, the heating heater 510 is stopped (S270, S280). The finish of the extraction of coffee is determined according to the temperature of the heating heater 137, or 237 measured at the temperature sensor 150.

In more detail, if the extraction of coffee is progressed for more than a preset time period, the temperature of the heating heater 137, or 237, having being at a fixed temperature, rises sharply. This is because the heating heater 137, or 237 is overheated due to shortage of potable water supplied to the funnel 133, or 233 through the water supply tube 135, or 235 as the extraction of coffee is progressed.

In this instance, determining that there is no potable water in the water tank 132, or 232 for extraction of coffee if the temperature of the heating heater 137, or 237 rises over a preset temperature, the control unit stops operation of the heating heater 137, or 237.

That is, the control unit, determining that the extraction of coffee is finished, stops the operation of the heating heater 137, or 237. In this instance, the heat conservation heater 138, or 238 is not stopped, but kept operated to maintain a temperature of the coffee in the jug 34 (290).

By extracting coffee both with the heating heater 137, or 237, and the heat conservation heater 138, or 238 operated at the same time, the fifth embodiment of the present invention shortens a time period required for extracting coffee.

Moreover, by stopping operation of the heating heater 137, or 237 determining that extraction of coffee is finished if the temperature of the heating heater 137, or 237 rises to a temperature higher than a preset temperature, the problem caused by overheating of the heating heater 137, or 237 is prevented.

FIG. 12 illustrates a flow chart showing the steps of a method for controlling a coffee maker and microwave oven in accordance with a sixth preferred embodiment of the present invention.

Referring to FIG. 12, a control unit of the coffee maker and microwave oven determines whether a coffee extraction order is received from a user or not (S300). In general, the coffee extraction order is applied to a key panel (not shown) on a front of the microwave oven unit.

As a result of determination (S300), if the coffee extraction order is received, potable water is supplied to the funnel 133, or 233, and, at the same time with this, the heating heater 137, or 237 is put into operation (S310).

In this instance, the potable water is heated by the heating heater 137, or 237 in a course the potable water is supplied to the funnel 133, or 233. The heated potable water extracts coffee at the funnel 133, or 233 (S320).

Then, the temperature sensor 150 measures a temperature T of the heating heater 137, or 237 periodically (S330). The control unit receives the temperature T having the temperature sensor 150 sensed, and calculates a rate ΔT of temperature change of the heating heater 137, or 237 (S340).

The rate of temperature change of the heating heater 137 or 237 is calculated according to the following equation.

$$\Delta T = (T_n - T_{n-1})/(t_n - t_{n-1})$$

Where, ΔT denotes a rate of temperature change of the heater, $T_n$ denotes the heating heater temperature measured at a $t_n$ time, and $T_{n-1}$ denotes the heating heater temperature measured at a $t_{n-1}$ time.

Then, the control unit determines whether the rate ΔT of temperature change exceeds a preset value (S340).

Determining that extraction of coffee is finished if the rate ΔT of temperature change exceeds the preset value, the heating heater 137, or 237 is stopped, and the heat conservation heater 150 is operated (S350) (S360).

That is, if the temperature of the heating heater 137, or 237 rises sharply such that the rate of temperature change is higher than a preset value, determining that extraction of coffee is finished, and no more potable water is supplied to the funnel 133, or 233, the heating heater 137, or 237 is stopped, and the heat conservation heater 138, or 238 is operated.

In this instance, the heat conservation heater 138, or 238 is operated for a preset heat conservation time period. When an operation time period of the heat conservation heater 138, or 238 passes the preset heat conservation time period, the heat conservation heater 138, or 238 is stopped, to terminate the heat conservation (S370) (S380).

Of course, if the operation time period of the heat conservation heater 138, or 238 does not exceed the preset heat conservation time period, the heat conservation heater 138, or 238 is kept operated, to maintain the temperature of the coffee.

On the other hand, if operation of the heat conservation heater 138, or 238 is stopped, the temperature of coffee in the jug 134, or 234 drops as time passes by.

In this instance, if a coffee temperature conservation order is received from the user (S390), the coffee conservation heater 138, or 238 is put into operation again, to conserve the temperature of the coffee, again.

It is preferable that a separate key is provided to the key panel the coffee extraction order is to be applied thereto, for application of the coffee temperature conservation order.

The sixth embodiment of the present invention permits to put the heat conservation heater 138, or 238 into operation any time according to order of the user even if operation of the coffee maker unit is stopped after extraction of coffee, to conserve the heat of the coffee in the jug 133, 233. According to this, the user can use the coffee maker unit more effectively.

As has been described, the coffee maker and microwave oven and method for controlling the same of the present invention have the following advantages.

The heating heater 137, or 237 and the heat conservation heater 138, or 238 provided separately for extraction of coffee and conservation of coffee temperature permit simultaneous use of the coffee maker unit and microwave oven unit.

The temperature sensor or the control method for preventing the heating heater 137, or 237 from overheating permits to have a plurality of additional advantages described above.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A coffee maker and microwave oven comprising:
a microwave generator for generating a microwave;
a cooking chamber for cooking food using the microwave transmitted to the cooking chamber;
an outfit room for mounting electric components therein;
a case in the outfit room;
a water tank in the case;
a funnel in the case and having a filter placed thereon for extracting coffee;
a jug under the funnel for storing the extracted coffee;
a water supply pipe having a first end connected to the water tank, a second end located over the funnel, and a portion on a bottom of the case; and
a heater assembly on the bottom of the case, the heater assembly having a heating heater for heating water passing through the water supply pipe, and a heat conservation heater for heating coffee in the jug to maintain a temperature of the coffee constant.

2. The coffee maker and microwave oven as claimed in claim 1, wherein the heater assembly further includes a heater tube in contact with the water supply pipe on the bottom of the case, the heating heater and the heat conservation heater being mounted in the heater tube.

3. The coffee maker and microwave oven as claimed in claim 2, wherein the heating heater includes a heating wire with a 750 W power consumption, and the heat conservation heater includes a heating wire with a 90 W power consumption.

4. The coffee maker and microwave oven as claimed in claim 3, wherein the heating heater has a fixed gap to the heat conservation heater.

5. The coffee maker and microwave oven as claimed in claim 4, wherein the heating heater is wound around an axis of the heater tube in a helix, and the heat conservation heater is wound along an inside circumferential surface of the heater tube in a helix.

6. The coffee maker and microwave oven as claimed in claim 3, wherein the heating heater and the heat conservation heater include insulating portion at both ends respectively, for preventing short circuit.

7. The coffee maker and microwave oven as claimed in claim 6, wherein the insulating portion of the heating heater is longer than the insulating portion of the heat conservation heater.

8. The coffee maker and microwave oven as claimed in claim 2, further comprising a temperature sensor on an outside surface of the heater tube for measuring a temperature of the heating heater.

9. The coffee maker and microwave oven as claimed in claim 8, wherein the temperature sensor includes a thermistor of which internal resistance varies with a temperature.

10. The coffee maker and microwave oven as claimed in claim 1, wherein the funnel is at a center of an inside of the water tank.

11. The coffee maker and microwave oven as claimed in claim 10, wherein the water pipe includes a shower head at the other end thereof over the funnel for spraying potable water into an inside of the funnel.

12. The coffee maker and microwave oven as claimed in claim 1, wherein the heater assembly further includes a heater tube in contact with the portion of the water supply pipe on the bottom of the case, the heating heater being located in the heater tube.

13. The coffee maker and microwave oven as claimed in claim 12, wherein the heating heater includes first terminals at both ends respectively connected to a coil for supplying power.

14. The coffee maker and microwave oven as claimed in claim 12, wherein the heating heater includes a sheath heater.

15. The coffee maker and microwave oven as claimed in claim 12, wherein the heat conservation heater is positioned opposite to the heating heater with respect to the portion of the water supply tube on the bottom of the case.

16. The coffee maker and microwave oven as claimed in claim 12, wherein the heat conservation heater includes a plate heater in close contact with an underside of the case.

17. The coffee maker and microwave oven as claimed in claim 16, wherein the heat conservation heater includes a second terminal on one side of an underside thereof connected to a coil for supplying power thereto.

18. The coffee maker and microwave oven as claimed in claim 17, wherein the heat conservation heater is enclosed with a metal plate having a good thermal conductivity excluding a portion having the second terminal formed thereon.

19. The coffee maker and microwave oven as claimed in claim 12, further comprising a heat conduction plate on an underside of the case for effective transmission of heat from the heat conservation heater to the jug, and the heat conservation heater is in close contact with an underside surface of the heat conduction plate.

20. The coffee maker and microwave oven as claimed in claim 16, wherein the case further includes a door panel on a front of the case, having a portion positioned below the heat conservation heater, and the heat conservation heater includes a shielding plate on an underside of the heat conservation heater for preventing transmission of heat from the heat conservation heater to the door panel.

21. The coffee maker and microwave oven as claimed in claim 17, wherein the second terminal includes at least two conductive wires wound around the second terminal and connected to the coil.

22. The coffee maker and microwave oven as claimed in claim 21, wherein the connection portion of the conductive wires and the coil further includes an insulating tube.

* * * * *